US010154516B2

(12) United States Patent
Hua et al.

(10) Patent No.: US 10,154,516 B2
(45) Date of Patent: Dec. 11, 2018

(54) SCHEDULING GRANT CONTROL METHOD, USER EQUIPMENT, AND NETWORK DEVICE

(71) Applicant: Huawei Technologies Co., Ltd., Shenzhen, Guangdong (CN)

(72) Inventors: Meng Hua, Shanghai (CN); Shurong Jiao, Shanghai (CN); Han Zhou, Shanghai (CN); Xueli Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 15/081,174

(22) Filed: Mar. 25, 2016

(65) Prior Publication Data
US 2016/0212763 A1 Jul. 21, 2016

Related U.S. Application Data

(63) Continuation of application No. PCT/CN2014/085863, filed on Sep. 3, 2014.

(30) Foreign Application Priority Data

Sep. 26, 2013 (CN) .......................... 2013 1 0447000

(51) Int. Cl.
*H04W 72/14* (2009.01)
*H04W 12/00* (2009.01)
*H04W 72/12* (2009.01)

(52) U.S. Cl.
CPC .......... *H04W 72/14* (2013.01); *H04W 12/00* (2013.01); *H04W 72/1284* (2013.01); *H04W 72/1268* (2013.01)

(58) Field of Classification Search
None
See application file for complete search history.

(56) References Cited

U.S. PATENT DOCUMENTS

2010/0130219 A1  5/2010  Cave et al.
2013/0136070 A1  5/2013  Cheng et al.
(Continued)

FOREIGN PATENT DOCUMENTS

CN  102378347 A  3/2012
CN  102761942 A  10/2012
(Continued)

*Primary Examiner* — Andrew Lai
*Assistant Examiner* — Jamaal R Henson

(57) ABSTRACT

A scheduling grant control method, user equipment, and a network device are disclosed. The method includes: receiving grant information sent by a network device, where the grant information indicates a grant value of data transmission on an uplink data channel by user equipment; determining an effectively starting moment of the grant information according to the grant value and a reception moment at which the grant information is received; and adjusting, on the uplink data channel and based on the grant value, transmission of the data at the effectively starting moment. Based on the foregoing technical solutions, in the scheduling grant control method in embodiments of the present invention, after receiving grant information, UE may flexibly select different effectively starting moments according to different grant information.

14 Claims, 4 Drawing Sheets

(56) References Cited

U.S. PATENT DOCUMENTS

| | | | |
|---|---|---|---|
| 2013/0188532 A1 | 7/2013 | Zhang et al. | |
| 2014/0036808 A1* | 2/2014 | Pelletier | H04W 72/14 |
| | | | 370/329 |
| 2014/0056198 A1 | 2/2014 | Quan et al. | |
| 2014/0369277 A1* | 12/2014 | Lampinen | H04W 52/146 |
| | | | 370/329 |
| 2016/0088653 A1 | 3/2016 | Januszewski et al. | |

FOREIGN PATENT DOCUMENTS

| | | |
|---|---|---|
| CN | 103220104 A | 7/2013 |
| CN | 103298130 A | 9/2013 |
| CN | 105359610 A | 2/2016 |
| EP | 2 509 370 A1 | 10/2012 |
| WO | WO 2014/180500 A1 | 11/2014 |

* cited by examiner

SCHEDULING GRANT CONTROL METHOD, USER EQUIPMENT, AND NETWORK DEVICE

CROSS-REFERENCE TO RELATED APPLICATIONS

This application is a continuation of International Application No. PCT/CN2014/085863, filed on Sep. 3, 2014, which claims priority to Chinese Patent Application No. 201310447000.1, filed on Sep. 26, 2013, both of which are hereby incorporated by reference in their entireties.

TECHNICAL FIELD

The present invention relates to the communications field, and in particular, to a scheduling grant control method, user equipment, and a network device.

BACKGROUND

In an HSUPA (High Speed Uplink Packet Access, high speed uplink packet access) system, a base station indicates, in a scheduling grant manner, maximum transmit power that can be used by UE (User Equipment, user equipment) on an uplink data transmission channel E-DPDCH (E-DCH Dedicated Physical Data Channel, enhanced dedicated channel dedicated physical data channel). The UE determines, according to a received grant value and with reference to remaining transmit power of the UE, a size of each data block that is transmitted in each TTI (Transmission Timing Interval, transmission timing interval) on the uplink data transmission channel E-DPDCH.

The base station delivers an absolute value of the grant value by using an E-AGCH (E-DCH Absolute Grant Channel, enhanced dedicated channel absolute grant channel). After receiving the grant value, the UE determines, according to an effectively starting moment agreed in advance, a TTI, in which HSUPA uplink data is transmitted by using power indicated by the new grant value or in which transmission of HSUPA uplink data is started or stopped, on the uplink data transmission channel E-DPDCH, but the method is not flexible enough. Especially, when a TDM (Time Division Multiplexing, time division multiplexing) scheduling manner is introduced into the HSUPA system, scheduling performance hits a bottleneck.

SUMMARY

Embodiments of the present invention provide a scheduling grant control method, user equipment, and a network device, which can improve selection flexibility of an effectively starting moment.

According to a first aspect, a scheduling grant control method is provided, including: receiving grant information sent by a network device, where the grant information indicates a grant value of data transmission on an uplink data channel by user equipment; determining an effectively starting moment of the grant information according to the grant value and a reception moment at which the grant information is received; and adjusting, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and the reception moment are defined by a same timing relationship, and timing relationships between effectively starting moments corresponding to grant values in different grant value sets and the reception moment are defined by different timing relationships.

With reference to the first aspect, in a first implementation manner of the first aspect, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

With reference to the first aspect and the foregoing implementation manner of the first aspect, in a second implementation manner of the first aspect, the uplink data channel is an enhanced dedicated channel dedicated physical data channel, and the data is High Speed Uplink Packet Access HSUPA uplink data; and the determining an effectively starting moment of the grant information according to the grant value and a reception moment at which the grant information is received includes: when the grant value belongs to the first grant value set, determining to start, in the $q^{th}$ subframe of a system frame number p of the enhanced dedicated channel dedicated physical data channel, to send the High Speed Uplink Packet Access HSUPA uplink data, where $p=i+s_1$ and $q=t_1$ define a timing relationship between the effectively starting moment and the reception moment, p represents the system frame number of an enhanced dedicated channel absolute grant channel corresponding to the effectively starting moment, q represents a subframe number of a system frame number corresponding to the effectively starting moment, i is a system frame number corresponding to the reception moment, $s_1$ is a first system frame number increment, and $t_1$ is a first subframe offset in a system frame; or when the grant value belongs to the second grant value set, determining to stop, in the $q^{th}$ subframe of the system frame number p of the enhanced dedicated channel dedicated physical data channel, sending the HSUPA uplink data, where $p=i+s_2$ and $q=t_2$ define a timing relationship between the effectively starting moment and the reception moment, $s_2$ is a second system frame number increment, and $t_2$ is a second subframe offset in a system frame.

With reference to the first aspect and the foregoing implementation manner of the first aspect, in a third implementation manner of the first aspect, $s_1$ and $t_1$ are determined according to the following formula:

$$s_1 = \left\lfloor \frac{\left\lceil \frac{30j + T_1 - (\tau_{DPCH,n}/256)}{30} \right\rceil}{5} \right\rfloor,$$

$$t_1 = \left\lceil \frac{30j + T_1 - (\tau_{DPCH,n}/256) - 150s_1}{30} \right\rceil;$$

and $s_2$ and $t_2$ are determined according to the following formula:

$$s_2 = \left\lfloor \frac{\left\lceil \frac{30j + T_2 - (\tau_{DPCH,n}/256)}{30} \right\rceil}{5} \right\rfloor,$$

-continued $$t_2 = \left\lceil \frac{30j + T_2 - (\tau_{DPCH,n}/256) - 150s_2}{30} \right\rceil,$$

where $T_1$ represents an effectively starting moment increment, $T_2=T_1+\Delta T$, $\Delta T$ is a positive or negative integer multiple of a length of a transmission timing interval TTI, j represents a subframe number of the system frame number corresponding to the reception moment, and $\tau_{DPCH,n}$ represents a timing offset of a downlink DPCCH channel.

With reference to the first aspect and the foregoing implementation manner of the first aspect, in a fourth implementation manner of the first aspect, the control method further includes: receiving $T_1$ and $\Delta T$ that are sent by the network device; or receiving $T_2$ and $\Delta T$ that are sent by the network device; or receiving $T_1$ and $T_2$ that are sent by the network device.

With reference to the first aspect and the foregoing implementation manners of the first aspect, in a fifth implementation manner of the first aspect, before the determining an effectively starting moment of the grant information according to the grant value and a reception moment at which the grant information is received, the control method further includes: receiving configuration signaling sent by the network device, where the configuration signaling is used to indicate starting the operation of determining the effectively starting moment of the grant information according to the grant value and the reception moment at which the grant information is received.

According to a second aspect, a scheduling grant control method is provided, including: determining grant information corresponding to user equipment, where the grant information indicates a grant value of data transmission on an uplink data channel by the user equipment, and the grant value can be used by the user equipment to determine an effectively starting moment of the grant information; sending the grant information to the user equipment, to schedule, by using the grant value, the user equipment to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and the reception moment at which the user equipment receives the grant information are defined by a same timing relationship, and timing relationships between effectively starting moments corresponding to grant values in different grant value sets and the reception moment are defined by different timing relationships.

With reference to the second aspect, in a first implementation manner of the second aspect, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

With reference to the second aspect and the foregoing implementation manner of the second aspect, in a second implementation manner of the second aspect, the control method further includes: sending configuration signaling to the user equipment, where the configuration signaling is used to instruct the user equipment to start the operation of determining the effectively starting moment of the grant information according to the grant value and the reception moment at which the grant information is received.

According to a third aspect, user equipment is provided, including: a receiving unit, configured to receive grant information sent by a network device, where the grant information indicates a grant value of data transmission on an uplink data channel by the user equipment; a determining unit, configured to determine an effectively starting moment of the grant information according to the grant value and a reception moment at which the grant information is received; and an adjustment unit, configured to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and the reception moment are defined by a same timing relationship, and timing relationships between effectively starting moments corresponding to grant values in different grant value sets and the reception moment are defined by different timing relationships.

With reference to the third aspect, in a first implementation manner of the third aspect, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

With reference to the third aspect and the foregoing implementation manner of the third aspect, in a second implementation manner of the third aspect, the uplink data channel is an enhanced dedicated channel dedicated physical data channel, and the data is High Speed Uplink Packet Access HSUPA uplink data; and the determining unit is specifically configured to: when the grant value indicated by the grant information belongs to the first grant value set, determine to start, in the $p^{th}$ subframe of a system frame number q of the enhanced dedicated channel dedicated physical data channel, to send the High Speed Uplink Packet Access HSUPA uplink data, where $p=i+s_1$ and $q=t_1$ define a timing relationship between the effectively starting moment and the reception moment, p represents the system frame number corresponding to the effectively starting moment, q represents a subframe number of the system frame number corresponding to the effectively starting moment, i is a system frame number of an enhanced dedicated channel absolute grant channel corresponding to the reception moment, $s_1$ is a first system frame number increment, and $t_1$ is a first subframe offset in a system frame; or when the grant value belongs to the second grant value set, determine to stop, in the $p^{th}$ subframe of the system frame number q of the enhanced dedicated channel dedicated physical data channel, sending the HSUPA uplink data, where $p=i+s_2$ and $q=t_2$ define a timing relationship between the effectively starting moment and the reception moment, $s_2$ is a second system frame number increment, and $t_2$ is a second subframe offset in a system frame.

With reference to the third aspect and the foregoing implementation manner of the third aspect, in a third implementation manner of the third aspect, the determining unit is specifically configured to:

determine $s_1$ and $t_1$ according to the following formula:

$$s_1 = \left\lfloor \frac{\left\lceil \frac{30j + T_1 - (\tau_{DPCH,n}/256)}{30} \right\rceil}{5} \right\rfloor,$$

$$t_1 = \left\lceil \frac{30j + T_1 - (\tau_{DPCH,n}/256) - 150s_1}{30} \right\rceil;$$

and determine $s_2$ and $t_2$ according to the following formula:

$$s_2 = \left\lfloor \frac{\left\lceil \frac{30j + T_2 - (\tau_{DPCH,n}/256)}{30} \right\rceil}{5} \right\rfloor,$$

$$t_2 = \left\lceil \frac{30j + T_2 - (\tau_{DPCH,n}/256) - 150s_2}{30} \right\rceil,$$

where $T_1$ represents an effectively starting moment increment, $T_2=T_1+\Delta T$, $\Delta T$ is a positive or negative integer multiple of a length of a transmission timing interval TTI, j represents a subframe number of the system frame number corresponding to the reception moment, and $\tau_{DPCH,n}$ represents a timing offset of a downlink DPCCH channel.

With reference to the third aspect and the foregoing implementation manner of the third aspect, in a fourth implementation manner of the third aspect, the receiving unit is further configured to: receive $T_1$ and $\Delta T$ that are sent by the network device; or receive $T_1$ and $\Delta T$ that are sent by the network device; or receive $T_1$ and $T_2$ that are sent by the network device.

With reference to the third aspect and the foregoing implementation manners of the third aspect, in a fifth implementation manner of the third aspect, the receiving unit is further configured to receive configuration signaling sent by the network device, where the configuration signaling is used to indicate starting the operation of determining the effectively starting moment of the grant information according to the grant value and the reception moment at which the grant information is received.

According to a fourth aspect, a network device is provided, including: a determining unit, configured to determine grant information corresponding to user equipment, where the grant information indicates a grant value of data transmission on an uplink data channel by the user equipment, and the grant value can be used by the user equipment to determine an effectively starting moment of the grant information; a sending unit, configured to send the grant information to the user equipment, to schedule, by using the grant value, the user equipment to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and the reception moment at which the user equipment receives the grant information are defined by a same timing relationship, and timing relationships between effectively starting moments corresponding to grant values in different grant value sets and the reception moment are defined by different timing relationships.

With reference to the fourth aspect, in a first implementation manner of the fourth aspect, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

With reference to the fourth aspect and the foregoing implementation manner of the fourth aspect, in a second implementation manner of the fourth aspect, the sending unit is further configured to send configuration signaling to the user equipment, where the configuration signaling is used to instruct the user equipment to start the operation of determining the effectively starting moment of the grant information according to the grant value and the reception moment at which the grant information is received.

Based on the foregoing technical solutions, in the scheduling grant control method in the embodiments of the present invention, after receiving grant information, UE may flexibly select different effectively starting moments according to different grant information. Especially, when a TDM scheduling mechanism is introduced into an HSUPA system, the embodiments of the present invention provide an applicable implementation manner for further improving scheduling performance.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System of Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system or the like.

It should also be understood that in the embodiments of the present invention, user equipment (User Equipment, UE for short) may be referred to as a terminal (Terminal), a mobile station (Mobile Station, MS for short), a mobile terminal (Mobile Terminal), and the like. The user equipment may communicate with one or more core networks through a radio access network (Radio Access Network, RAN for short). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a network device may be a base station (Base Transceiver Station, "BTS" for short) in GSM or CDMA, a NodeB (NodeB, "NB" for short) in WCDMA or a radio network controller (Radio Network Controller, "RNC" for short), or an evolved NodeB (Evolutional Node B, "eNB or e-NodeB" for short) in LTE. The present invention sets no limitation thereto.

Figure 1:
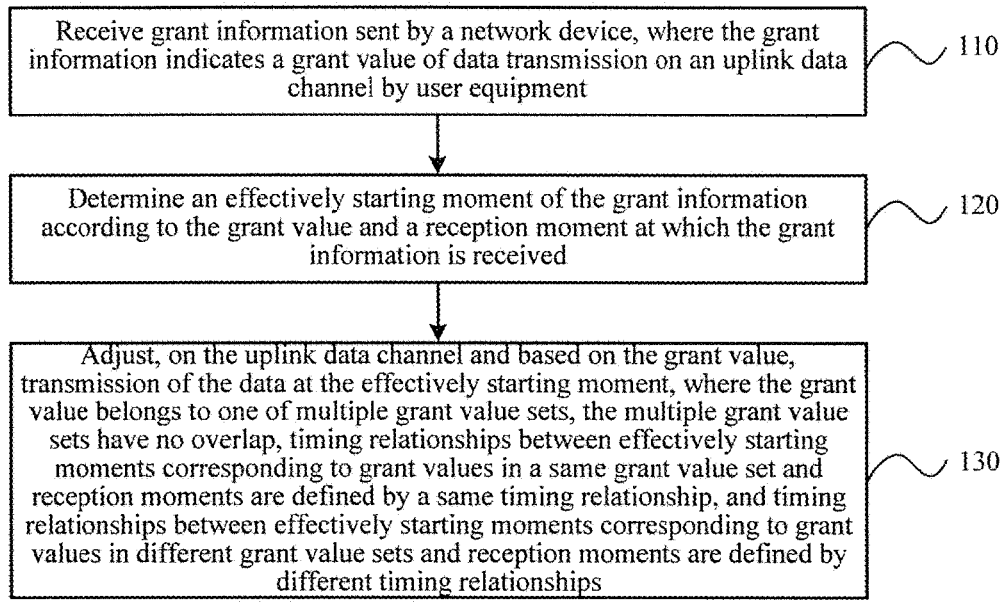
FIG. 1 is a schematic flowchart of a scheduling grant control method according to an embodiment of the present invention.

FIG. 1 is a schematic flowchart of a scheduling grant control method according to an embodiment of the present invention. The method 100 in FIG. 1 may be executed by UE.

110: Receive grant information sent by a network device, where the grant information indicates a grant value of data transmission on an uplink data channel by user equipment.

120: Determine an effectively starting moment of the grant information according to the grant value and a reception moment at which the grant information is received.

130: Adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and reception moments are defined by a same timing relationship, and timing relationships between effectively starting moments corresponding to grant values in different grant value sets and reception moments are defined by different timing relationships.

Based on the foregoing technical solution, in the scheduling grant control method in this embodiment of the present invention, after receiving grant information, UE may flexibly select different effectively starting moments according to different grant information. Especially, when a TDM scheduling mechanism is introduced into an HSUPA system, this embodiment of the present invention provides an applicable implementation manner for further improving scheduling performance.

It should be understood that in this embodiment of the present invention, the reception moment and the effectively starting moment of the grant information each correspond to a frame number in the communications system. For example, when this embodiment of the present invention is applied to an HSUPA communications system in which each TTI is configured to be 2 ms, the reception moment and the effectively starting moment each correspond to a system frame number and a corresponding subframe number. Generally, one transmission subframe has a length of one TTI. When this embodiment of the present invention is applied to an HSUPA communications system in which each TTI is configured to be 10 ms, the reception moment and the effectively starting moment each correspond to a system frame number.

For example, when the TDM scheduling mechanism is introduced into the HSUPA system, according to this embodiment of the present invention, it may be predefined that in one scheduling process, a moment at which grant information is sent to first user equipment (which corresponds to user equipment whose granted permission is canceled) is a period of time later than a moment at which grant information is sent to second user equipment (which corresponds to user equipment that is granted a permission to send HSUPA uplink data). In this way, the first user equipment and the second user equipment can determine effectively starting moments of the pieces of grant information according to the received pieces of grant information and the reception moments at which the pieces of grant information are received. In this way, it can be implemented that the first user equipment stops sending HSUPA uplink data and the second user equipment starts to send HSUPA uplink data at a same moment (which corresponds to a system frame number and a subframe number). Therefore, a transmission gap or mutual interference caused when the foregoing operations do not occur at a same moment is avoided, and scheduling performance is improved.

Optionally, as an embodiment, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

It should be understood that a non-zero-value grant value indicates that in a process in which the UE transmits HSUPA uplink scheduling data in a corresponding TTI, a maximum power ratio of an enhanced dedicated channel dedicated physical data channel (E-DPDCH) to a dedicated physical control channel is a non-zero value. A zero-value grant value indicates that in a process in which HSUPA uplink scheduling data is transmitted in a corresponding TTI, a maximum power ratio of an enhanced dedicated channel dedicated physical data channel to a dedicated physical control channel is less than any non-zero-value grant value, and the value may be zero or may not be zero. An inactive grant value indicates that the UE cannot transmit HSUPA uplink scheduling data in a corresponding TTI. It should also be understood that the corresponding TTI is a TTI corresponding to the effectively starting moment of the grant information.

For example, Table 1 and Table 2 each define a correspondence between indexes and absolute grant values. The grant information may include an index, and the UE determines an absolute grant value according to the index. Absolute grant values corresponding to indexes 2 to 31 are non-zero-value grant values, an absolute grant value (ZERO_GRANT*) corresponding to index 1 is a zero-value grant value, and an absolute grant value corresponding to index 0 is an inactive grant value (INACTIVE*).

TABLE 1

| Absolute grant value | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

TABLE 2

| Absolute grant value | Index |
|---|---|
| $(377/15)^2 \times 4$ | 31 |
| $(237/15)^2 \times 6$ | 30 |
| $(168/15)^2 * 6$ | 29 |
| $(150/15)^2 * 6$ | 28 |
| $(168/15)^2 * 4$ | 27 |
| $(150/15)^2 \times 4$ | 26 |
| $(134/15)^2 \times 4$ | 25 |
| $(119/15)^2 \times 4$ | 24 |
| $(150/15)^2 \times 2$ | 23 |
| $(95/15)^2 \times 4$ | 22 |
| $(168/15)^2$ | 21 |
| $(150/15)^2$ | 20 |
| $(134/15)^2$ | 19 |
| $(119/15)^2$ | 18 |
| $(106/15)^2$ | 17 |
| $(95/15)^2$ | 16 |
| $(84/15)^2$ | 15 |
| $(75/15)^2$ | 14 |
| $(67/15)^2$ | 13 |
| $(60/15)^2$ | 12 |
| $(53/15)^2$ | 11 |
| $(47/15)^2$ | 10 |
| $(42/15)^2$ | 9 |
| $(38/15)^2$ | 8 |
| $(34/15)^2$ | 7 |
| $(30/15)^2$ | 6 |
| $(27/15)^2$ | 5 |
| $(24/15)^2$ | 4 |

TABLE 2-continued

| Absolute grant value | Index |
|---|---|
| $(19/15)^2$ | 3 |
| $(15/15)^2$ | 2 |
| ZERO_GRANT* | 1 |
| INACTIVE* | 0 |

Optionally, as another embodiment, in step 120, the uplink data channel is an enhanced dedicated channel dedicated physical data channel, and the data is High Speed Uplink Packet Access HSUPA uplink data. When the effectively starting moment of the grant information is determined according to the grant value and the reception moment at which the grant information is received, when the grant value belongs to the first grant value set, it is determined that transmission of the High Speed Uplink Packet Access HSUPA uplink data is started in the $q^{th}$ subframe of a system frame number p of the enhanced dedicated channel dedicated physical data channel, where $p=i+s_1$ and $q=t_1$ define a timing relationship between the effectively starting moment and the reception moment, p represents the system frame number corresponding to the effectively starting moment, q represents a subframe number of a system frame number of an enhanced dedicated channel absolute grant channel corresponding to the effectively starting moment, i is a system frame number corresponding to the reception moment, $s_1$ is a first system frame number increment, and $t_1$ is a first subframe offset in a system frame; or when the grant value belongs to the second grant value set, it is determined that transmission of the HSUPA uplink data is stopped in the $q^{th}$ subframe of the system frame number p, where $p=i+s_2$ and $q=t_2$ define a timing relationship between the effectively starting moment and the reception moment, $s_2$ is a second system frame number increment, and $t_2$ is a second subframe offset in a system frame.

It should be understood that the first system frame number increment and the second system frame number increment each represent an increment or an offset of a system frame number on the enhanced dedicated channel dedicated physical data channel, and the first subframe offset and the second subframe offset each represent an offset of a subframe number in a system frame number on the enhanced dedicated channel dedicated physical data channel.

Optionally, as another embodiment, $s_1$ and $t_1$ are determined according to formula (1):

$$s_1 = \left\lfloor \frac{\left\lceil \frac{30j + T_1 - (\tau_{DPCH,n}/256)}{30} \right\rceil}{5} \right\rfloor, \qquad (1)$$

$$t_1 = \left\lceil \frac{30j + T_1 - (\tau_{DPCH,n}/256) - 150 s_1}{30} \right\rceil;$$

and $s_2$ and $t_2$ are determined according to formula (2):

$$s_2 = \left\lfloor \frac{\left\lceil \frac{30j + T_2 - (\tau_{DPCH,n}/256)}{30} \right\rceil}{5} \right\rfloor, \qquad (2)$$

$$t_2 = \left\lceil \frac{30j + T_2 - (\tau_{DPCH,n}/256) - 150 s_2}{30} \right\rceil,$$

where $T_1$ represents an effectively starting moment increment, $T_2=T_1+\Delta T$, $\Delta T$ is a positive or negative integer multiple of a length of a transmission timing interval TTI, j represents a subframe number of the system frame number corresponding to the reception moment, and $\tau_{DPCH,n}$ represents a timing offset of a downlink DPCCH channel.

It should be understood that a symbol when a spreading factor is 256 is used as a time unit of each of 30j, $T_1$, $T_2$, and $\Delta T$, a chip is used as a time unit of $\tau_{DPCH,n}$ a symbol is also used as a time unit of $\tau_{DPCH,n}$ divided by 256, and one TTI is equal to 30 symbols. When an F-DPCH (Fractional Dedicated Physical Channel, fractional dedicated physical channel) channel is configured in a cell in which the UE is located, $\tau_{DPCH,n} = \tau_{F-DPCH,n}$.

Optionally, as another embodiment, the UE may further receive $T_1$ and $\Delta T$ that are sent by the network device; or receive $T_2$ and $\Delta T$ that are sent by the network device; or receive $T_1$ and $T_2$ that are sent by the network device.

Optionally, the network device and the user equipment may agree on $T_1$ and $\Delta T$, $T_2$ and $\Delta T$, or $T_1$ and $T_2$, or the network device and the user equipment may agree on $\Delta T$, and the user equipment receives $T_1$ or $T_2$ that is sent by the network device, which shall all fall into the protection scope of this embodiment of the present invention.

Optionally, as another embodiment, before step 120, the UE may further receive configuration signaling sent by the network device, where the configuration signaling is used to indicate starting the operation of determining the effectively starting moment of the grant information according to the grant information and the reception moment at which the grant information is received. In this way, the UE can flexibly select, according to the configuration signaling, whether to determine the effectively starting moment of the grant information according to the grant information and the reception moment at which the grant information is received or to determine the effectively starting moment of the grant information according to the reception moment at which the grant information is received.

Optionally, when switching from a conventional HSUPA system to an HSUPA system into which a TDM scheduling mode is introduced or when switching to a preset uplink carrier, the UE may determine to determine the effectively starting moment of the grant information according to the grant information and the reception moment at which the grant information is received. When switching from an HSUPA system into which a TDM scheduling mode is introduced to a conventional HSUPA system or when switching to a preset uplink carrier, the UE may determine not to determine the effectively starting moment of the grant information according to the grant information and the reception moment at which the grant information is received.

Figure 2:
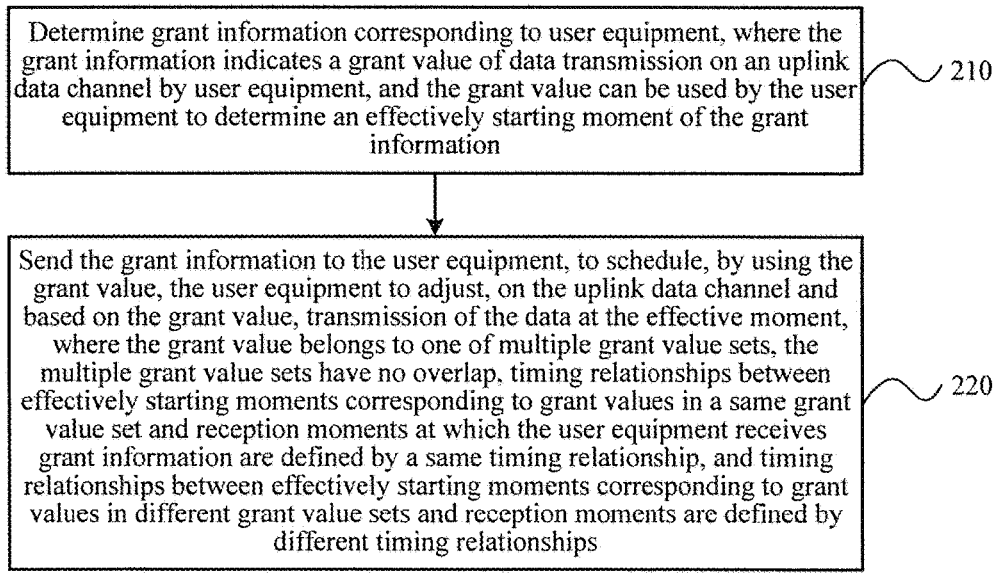
FIG. 2 is a schematic flowchart of a scheduling grant control method according to another embodiment of the present invention.

FIG. 2 is a schematic flowchart of a scheduling grant control method according to another embodiment of the present invention. The method 200 in FIG. 2 may be executed by a network device.

210: Determine grant information corresponding to user equipment, where the grant information indicates a grant value of data transmission on an uplink data channel by the user equipment, and the grant value can be used by the user equipment to determine an effectively starting moment of the grant information.

220: Send the grant information to the user equipment, to schedule, by using the grant value, the user equipment to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and reception moments at which the user equipment receives grant information are defined by a same timing relationship, and timing relationships between effectively starting moments corresponding to grant values in different grant value sets and reception moments are defined by different timing relationships.

Based on the foregoing technical solution, in the scheduling grant control method in this embodiment of the present invention, after receiving grant information, UE may flexibly select different effectively starting moments according to different grant information. Especially, when a TDM scheduling mechanism is introduced into an HSUPA system, this embodiment of the present invention provides an applicable implementation manner for further improving scheduling performance.

It should be understood that in this embodiment of the present invention, the reception moment and the effectively starting moment of the grant information each correspond to a frame number in the communications system. For example, when this embodiment of the present invention is applied to an HSUPA communications system in which each TTI is configured to be 2 ms, the reception moment and the effectively starting moment each correspond to a system frame number and a corresponding subframe number. Generally, one transmission subframe has a length of one TTI. When this embodiment of the present invention is applied to an HSUPA communications system in which each TTI is configured to be 10 ms, the reception moment and the effectively starting moment each correspond to a system frame number.

For example, when the TDM scheduling mechanism is introduced into the HSUPA system, according to this embodiment of the present invention, it may be predefined that in one scheduling process, a moment at which grant information is sent to first user equipment (which corresponds to user equipment whose granted permission is cancelled) is a period of time later than a moment at which grant information is sent to second user equipment (which corresponds to user equipment that is granted a permission to send HSUPA uplink data). In this way, the first user equipment and the second user equipment can determine effectively starting moments of the pieces of grant information according to the received pieces of grant information and the reception moments at which the pieces of grant information are received. In this way, it can be implemented that, the first user equipment stops sending HSUPA uplink data and the second user equipment starts to send HSUPA uplink data at a same moment (which corresponds to a system frame number and a subframe number). Therefore, a transmission gap or mutual interference caused when the foregoing operations do not occur at a same moment is avoided, and scheduling performance is improved.

Optionally, as an embodiment, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

It should be understood that a non-zero-value grant value indicates that in a process in which the UE transmits HSUPA uplink scheduling data in a corresponding TTI, a maximum power ratio of an enhanced dedicated channel dedicated physical data channel (E-DPDCH) to a dedicated physical control channel is a non-zero value. A zero-value grant value indicates that in a process in which HSUPA uplink scheduling data is transmitted in a corresponding TTI, a maximum power ratio of an enhanced dedicated channel dedicated physical data channel to a dedicated physical control channel is less than any non-zero-value grant value, and the value may be zero or may not be zero. An inactive grant value indicates that the UE cannot transmit HSUPA uplink scheduling data in a corresponding TTI. It should also be understood that the corresponding TTI is a TTI corresponding to the effectively starting moment of the grant information.

Optionally, as another embodiment, the network device may further send configuration signaling to the user equipment, where the configuration signaling is used to instruct the user equipment to start the operation of determining the effectively starting moment of the grant information according to the grant information and the reception moment at which the grant information is received. In this way, the UE can flexibly select, according to the configuration signaling, whether to determine the effectively starting moment of the grant information according to the grant information and the reception moment at which the grant information is received or to determine the effectively starting moment of the grant information according to the reception moment at which the grant information is received.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The following describes in detail the embodiments of the present invention with reference to specific examples. It should be noted that these examples are merely intended to help a person skilled in the art to better understand the embodiments of the present invention, and are not intended to limit the scope of the embodiments of the present invention.

Figure 3:
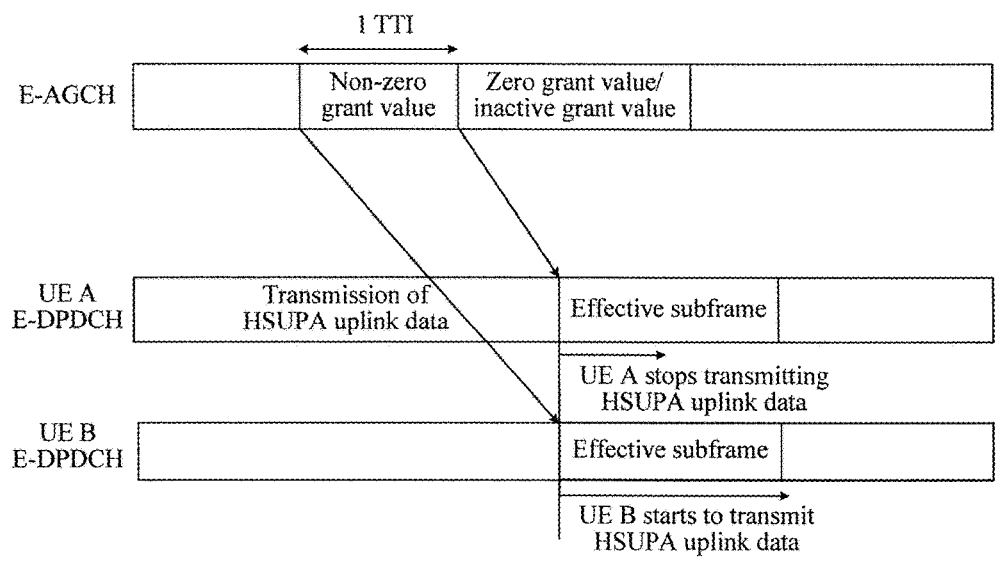
FIG. 3 is a schematic sequence diagram of a scheduling grant control method according to an embodiment of the present invention.

FIG. 3 is a schematic sequence diagram of a scheduling grant control method according to an embodiment of the present invention.

FIG. 3 shows that a network device separately delivers absolute grant values to UE A and UE B by using a channel E-AGCH, and shows a sequence of corresponding operations performed after UE A and UE B receive the absolute grant values. It is assumed that according to grant information delivered by the network device, UE A is transmitting HSUPA uplink data at a current moment. According to a scheduling requirement, the network device delivers a non-zero grant value to UE B at a first moment (which corresponds to the $j_1^{th}$ subframe of a system frame number $i_1$), to instruct UE B to start to transmit HSUPA uplink data, and delivers a zero grant value or an inactive grant value to UE A at a second moment (which corresponds to the $j_2^{th}$ subframe of the system frame number $i_2$ to instruct UE A to stop transmitting HSUPA uplink data. As shown in FIG. 3, the non-zero grant value is delivered one TTI earlier than the zero grant value/the inactive grant value. In this way, a moment at which UE B receives the non-zero grant value is one TTI earlier than a moment at which UE A receives the zero grant value/the inactive grant value.

In this case, UE B may determine, according to formula (3), an effectively starting moment of the non-zero grant value, that a moment at which UE B starts to transmit HSUPA uplink data:

$$s_1 = \left\lfloor \frac{\left\lceil \frac{30j_1 + 100 - (\tau_{DPCH,n}/256)}{30} \right\rceil}{5} \right\rfloor, \quad (3)$$

$$t_1 = \left\lceil \frac{30j_1 + 100 - (\tau_{DPCH,n}/256) - 150s_1}{30} \right\rceil.$$

According to a calculation result of formula (3), UE B starts, in the $t_1^{th}$ subframe of a system frame number $i_1+s_1$, to transmit HSUPA uplink data.

UE A may determine, according to formula (4), an effectively starting moment of the zero grant value/the inactive grant value, that is, a moment at which UE A stops transmitting HSUPA uplink data:

$$s_2 = \left\lfloor \frac{\left\lceil \frac{30j_2 + 70 - (\tau_{DPCH,n}/256)}{30} \right\rceil}{5} \right\rfloor, \quad (4)$$

$$t_2 = \left\lceil \frac{30j + 70 - (\tau_{DPCH,n}/256) - 150s_2}{30} \right\rceil.$$

According to a calculation result of formula (4), UE A stops, in the $t_2^{th}$ subframe of a system frame number $i_2+s_2$, transmitting the HSUPA uplink data.

According to the foregoing description, the $j_1^{th}$ subframe of the system frame number $i_1$ is one TTI earlier than the $j_2^{th}$ subframe of the system frame number $i_2$, and the effectively starting moments obtained with reference to the foregoing formulas (3) and (4) satisfy: $i_1+s_1=i_2+s_2$ and $t_1=t_2$. In this way, UE A stops transmitting HSUPA uplink data, and UE B starts to transmit HSUPA uplink data at a same moment. Therefore, a transmission gap or mutual interference caused when the foregoing operations do not occur at a same moment is avoided, and scheduling performance is improved.

The foregoing describes in detail the scheduling grant control method according to the embodiments of the present invention with reference to the FIG. 1 to FIG. 3, and the following describes UE and a network device according to embodiments of the present invention with reference to the FIG. 4 to FIG. 7.

Figure 4:
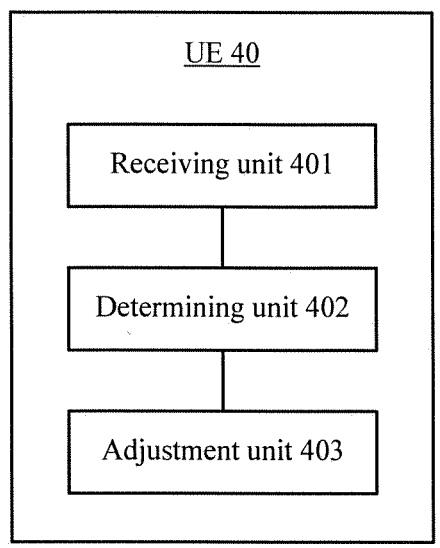
FIG. 4 is a schematic block diagram of UE according to an embodiment of the present invention.

FIG. 4 is a schematic block diagram of UE according to an embodiment of the present invention. The UE 40 in FIG. 4 includes a receiving unit 401 and a determining unit 402.

The receiving unit 401 is configured to receive grant information sent by a network device, where the grant information indicates a grant value of data transmission on an uplink data channel by the user equipment.

The determining unit 402 is configured to determine an effectively starting moment of the grant information according to the grant value and a reception moment at which the grant information is received.

An adjustment unit 403 is configured to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and reception moments are defined by a same timing relationship, and timing relationships between effectively starting moments corresponding to grant values in different grant value sets and reception moments are defined by different timing relationships.

Based on the foregoing technical solution, in the scheduling grant control method in this embodiment of the present invention, after receiving grant information, UE may flexibly select different effectively starting moments according to different grant information. Especially, when a TDM scheduling mechanism is introduced into an HSUPA system, this embodiment of the present invention provides an applicable implementation manner for further improving scheduling performance.

It should be understood that in this embodiment of the present invention, the reception moment and the effectively starting moment of the grant information each correspond to a frame number in the communications system. For example, when this embodiment of the present invention is applied to an HSUPA communications system in which a each TTI is configured to be 2 ms, the reception moment and the effectively starting moment each correspond to a system frame number and a corresponding subframe number. Generally, one transmission subframe has a length of one TTI. When this embodiment of the present invention is applied to an HSUPA communications system in which each TTI is configured to be 10 ms, the reception moment and the effectively starting moment each correspond to a system frame number.

For example, when the TDM scheduling mechanism is introduced into the HSUPA system, according to this embodiment of the present invention, it may be predefined that in one scheduling process, a moment at which grant information is sent to first user equipment (which corresponds to user equipment whose granted permission is cancelled) is a period of time later than a moment at which grant information is sent to second user equipment (which corresponds to user equipment that is granted a permission to send HSUPA uplink data). In this way, the first user equipment and the second user equipment can determine effectively starting moments of the pieces of grant information according to the received pieces of grant information and the reception moments at which the pieces of grant information are received. In this way, it can be implemented that the first user equipment stops sending HSUPA uplink data and the second user equipment starts to send HSUPA uplink data at a same moment (which corresponds to a system frame number and a subframe number). Therefore, a transmission gap or mutual interference caused when the foregoing operations do not occur at a same moment is avoided, and scheduling performance is improved.

Optionally, as an embodiment, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

It should be understood that a non-zero-value grant value indicates that in a process in which the UE transmits HSUPA uplink scheduling data in a corresponding TTI, a maximum power ratio of an enhanced dedicated channel dedicated physical data channel (E-DPDCH) to a dedicated physical control channel is a non-zero value. A zero-value grant value indicates that in a process in which HSUPA uplink scheduling data is transmitted in a corresponding TTI, a maximum power ratio of an enhanced dedicated channel dedicated physical data channel to a dedicated physical control channel is less than any non-zero-value grant value, and the value may be zero or may not be zero. An inactive grant value indicates that the UE cannot transmit HSUPA uplink scheduling data in a corresponding TTI. It should also be understood that the corresponding TTI is a TTI corresponding to the effectively starting moment of the grant information.

Optionally, as another embodiment, the uplink data channel is an enhanced dedicated channel dedicated physical data channel, and the data is High Speed Uplink Packet Access HSUPA uplink data; and the determining unit 402 is specifically configured to: when the grant value belongs to the first grant value set, determine to start, in the $p^{th}$ subframe of a system frame number q of the enhanced dedicated channel dedicated physical data channel, to send the High Speed Uplink Packet Access HSUPA uplink data, where $p=i+s_1$ and $q=t_1$ define a timing relationship between the effectively starting moment and the reception moment, p represents the system frame number of an enhanced dedicated channel absolute grant channel corresponding to the effectively starting moment, q represents a subframe number of a system frame number corresponding to the effectively starting moment, i is a system frame number corresponding to the reception moment, $s_1$ is a first system frame number increment, and $t_1$ is a first subframe offset in a system frame; or when the grant value belongs to the second grant value set, determine to stop, in the $p^{th}$ subframe of the system frame number q of the enhanced dedicated channel dedicated physical data channel, sending the HSUPA uplink data, where $p=i+s_2$ and $q=t_2$ define a timing relationship between the effectively starting moment and the reception moment, $s_2$ is a second system frame number increment, and $t_2$ is a second subframe offset in a system frame.

It should be understood that the first system frame number increment and the second system frame number increment each represent an increment or an offset of a system frame number on the enhanced dedicated channel dedicated physical data channel, and the first subframe offset and the second subframe offset each represent an offset of a subframe number in a system frame number on the enhanced dedicated channel dedicated physical data channel.

Optionally, as another embodiment, the determining unit 402 is specifically configured to:

determine $s_1$ and $t_1$ according to formula (5)

$$s_1 = \left\lfloor \frac{\left\lceil \frac{30j + T_1 - (\tau_{DPCH,n}/256)}{30} \right\rceil}{5} \right\rfloor, \quad (5)$$

$$t_1 = \left\lceil \frac{30j + T_1 - (\tau_{DPCH,n}/256) - 150 s_1}{30} \right\rceil;$$

and
determine $s_2$ and $t_2$ according to formula (6):

$$s_2 = \left\lfloor \frac{\left\lceil \frac{30j + T_2 - (\tau_{DPCH,n}/256)}{30} \right\rceil}{5} \right\rfloor, \quad (6)$$

$$t_2 = \left\lceil \frac{30j + T_2 - (\tau_{DPCH,n}/256) - 150 s_2}{30} \right\rceil,$$

where $T_1$ represents an effectively starting moment increment, $T_2=T_1+\Delta T$, $\Delta T$ is a positive or negative integer multiple of a length of a transmission timing interval TTI, j represents a subframe number of the system frame number corresponding to the reception moment, and $\tau_{DPCH,n}$ represents a timing offset of a downlink DPCCH channel.

It should be understood that a symbol when a spreading factor is 256 is used as a time unit of each of 30j, $T_1$, $T_2$, and $\Delta T$, a chip is used as a time unit of $\tau_{DPCH,n}$, a symbol is also used as a time unit of $\tau_{DPCH,n}$ divided by 256, and one TTI is equal to 30 symbols. When an F-DPCH channel is configured in a cell in which the UE is located, $\tau_{DPCH,n} = \tau_{F\text{-}DPCH,n}$.

Optionally, as another embodiment, the receiving unit 401 is further configured to: receive $T_1$ and $\Delta T$ that are sent by the network device; or receive $T_2$ and $\Delta T$ that are sent by the network device; or receive $T_1$ and $T_2$ that are sent by the network device.

Optionally, the network device and the user equipment may agree on $T_1$ and $\Delta T$, $T_2$ and $\Delta T$, or $T_1$ and $T_2$, or the network device and the user equipment may agree on $\Delta T$, and the user equipment receives $T_1$ or $T_2$ that is sent by the network device, which shall all fall into the protection scope of this embodiment of the present invention.

Optionally, as another embodiment, the receiving unit 401 is further configured to receive configuration signaling sent by the network device, where the configuration signaling is used to indicate starting the operation of determining the effectively starting moment of the grant information according to the grant information and the reception moment at which the grant information is received. In this way, the UE can flexibly select, according to the configuration signaling, whether to determine the effectively starting moment of the grant information according to the grant information and the reception moment at which the grant information is received or to determine the effectively starting moment of the grant information according to the reception moment at which the grant information is received.

Optionally, when switching from a conventional HSUPA system to an HSUPA system into which a TDM scheduling mode is introduced or when switching to a preset uplink carrier, the UE may determine to determine the effectively starting moment of the grant information according to the grant information and the reception moment at which the grant information is received. When switching from an HSUPA system into which a TDM scheduling mode is introduced to a conventional HSUPA system or when switching to a preset uplink carrier, the UE may determine not to determine the effectively starting moment of the grant information according to the grant information and the reception moment at which the grant information is received.

Figure 5:
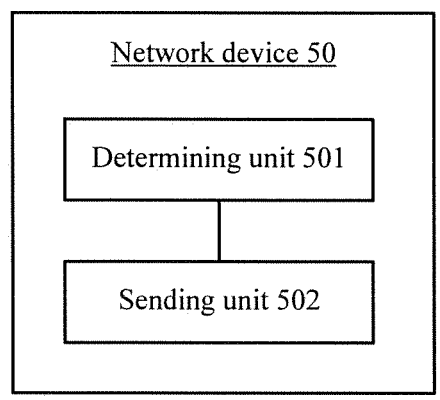
FIG. 5 is a schematic block diagram of a network device according to an embodiment of the present invention.

FIG. 5 is a schematic block diagram of a network device according to an embodiment of the present invention. The network device 50 in FIG. 5 includes a determining unit 501 and a sending unit 502.

The determining unit 501 is configured to determine grant information corresponding to user equipment, where the grant information indicates a grant value of data transmission on an uplink data channel by the user equipment, and the grant value can be used by the user equipment to determine an effectively starting moment of the grant information.

The sending unit 502 is configured to send the grant information to the user equipment, to schedule, by using the grant value, the user equipment to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and reception moments at which the user equipment receives grant information are defined by a same timing relationship, and timing relationships between effectively starting moments corresponding to grant values in different grant value sets and reception moments are defined by different timing relationships.

Based on the foregoing technical solution, in the scheduling grant control method in this embodiment of the present invention, after receiving grant information, UE may flexibly select different effectively starting moments according to different grant information. Especially, when a TDM scheduling mechanism is introduced into an HSUPA system, this embodiment of the present invention provides an applicable implementation manner for further improving scheduling performance.

It should be understood that in this embodiment of the present invention, the reception moment and the effectively starting moment of the grant information each correspond to a frame number in the communications system. For example, when this embodiment of the present invention is applied to an HSUPA communications system in which each TTI is configured to be 2 ms, the reception moment and the effectively starting moment each correspond to a system frame number and a corresponding subframe number. Generally, one transmission subframe has a length of one TTI. When this embodiment of the present invention is applied to an HSUPA communications system in which each TTI is configured to be 10 ms, the reception moment and the effectively starting moment each correspond to a system frame number.

For example, when the TDM scheduling mechanism is introduced into the HSUPA system, according to this embodiment of the present invention, it may be predefined that in one scheduling process, a moment at which grant information is sent to first user equipment (which corresponds to user equipment whose granted permission is cancelled) is a period of time later than a moment at which grant information is sent to second user equipment (which corresponds to user equipment that is granted a permission to send HSUPA uplink data). In this way, the first user equipment and the second user equipment can determine effectively starting moments of the pieces of grant information according to the received pieces of grant information and the reception moments at which the pieces of grant information are received. In this way, it can be implemented that the first user equipment stops sending HSUPA uplink data and the second user equipment starts to send HSUPA uplink data at a same moment (which corresponds to a system frame number and a subframe number). Therefore, a transmission gap gap or mutual interference caused when the foregoing operations do not occur at a same moment is avoided, and scheduling performance is improved.

Optionally, as an embodiment, the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

It should be understood that a non-zero-value grant value indicates that in a process in which the UE transmits HSUPA uplink scheduling data in a corresponding TTI, a maximum power ratio of an enhanced dedicated channel dedicated physical data channel (E-DPDCH) to a dedicated physical control channel is a non-zero value. A zero-value grant value indicates that in a process in which HSUPA uplink scheduling data is transmitted in a corresponding TTI, a maximum power ratio of an enhanced dedicated channel dedicated physical data channel to a dedicated physical control channel is less than any non-zero-value grant value, and the value may be zero or may not be zero. An inactive grant value indicates that the UE cannot transmit HSUPA uplink scheduling data in a corresponding TTI. It should also be understood that the corresponding TTI is a TTI corresponding to the effectively starting moment of the grant information.

Optionally, as another embodiment, the sending unit 502 is further configured to send configuration signaling to the user equipment, where the configuration signaling is used to instruct the user equipment to start the operation of determining the effectively starting moment of the grant information according to the grant information and the reception moment at which the grant information is received. In this way, the UE can flexibly select, according to the configuration signaling, whether to determine the effectively starting moment of the grant information according to the grant information and the reception moment at which the grant information is received or to determine the effectively starting moment of the grant information according to the reception moment at which the grant information is received.

Figure 6:
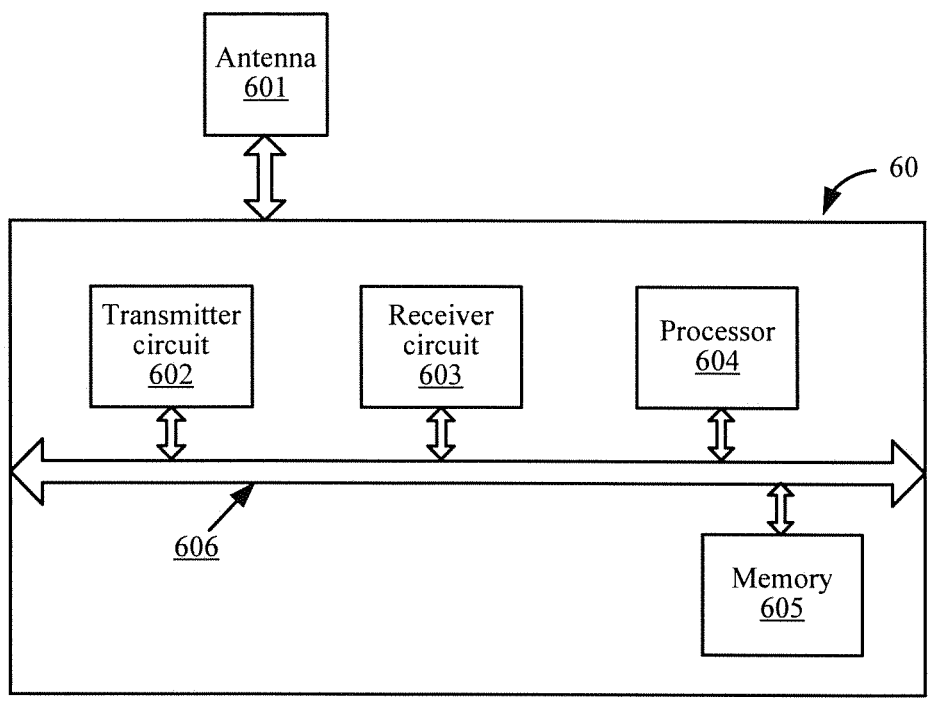
FIG. 6 is a schematic block diagram of UE according to another embodiment of the present invention.

FIG. 6 is a schematic block diagram of UE according to another embodiment of the present invention.

The UE 60 in FIG. 6 may be configured to implement the steps and the methods in the foregoing method embodiments. The UE 60 may be applied to various communications systems. In this embodiment in FIG. 6, the UE 60 includes an antenna 601, a transmitter circuit 602, a receiver circuit 603, a processor 604, and a memory 605. The processor 604 controls an operation by the UE 60, and may be configured to process a signal. The memory 605 may include a read-only memory and a random access memory, and provide an instruction and data to the processor 604. The transmitter circuit 602 and the receiver circuit 603 may be coupled to the antenna 601. Components of the UE 60 are coupled together by using a bus system 606, where besides a data bus, the bus system 606 further includes a power supply bus, a control bus, and a status signal bus. However, to make the description clear, all buses are marked as the bus system 606 in the figure.

Specifically, the memory 605 may store an instruction that enables the processor 604 to execute the following processes:

receiving grant information sent by a network device, where the grant information indicates a grant value of data transmission on an uplink data channel by the user equipment; determining an effectively starting moment of the grant information according to the grant value and a reception moment at which the grant information is received; and adjusting, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and reception moments are defined by a same timing relationship, and timing relationships between effectively starting moments corresponding to grant values in different grant value sets and reception moments are defined by different timing relationships.

Based on the foregoing technical solution, in the scheduling grant control method in this embodiment of the present invention, after receiving grant information, UE may flexibly select different effectively starting moments according to different grant information. Especially, when a TDM scheduling mechanism is introduced into an HSUPA system, this embodiment of the present invention provides an applicable implementation manner for further improving scheduling performance.

It should be understood that in this embodiment of the present invention, the reception moment and the effectively starting moment of the grant information each correspond to a frame number in the communications system. For example, when this embodiment of the present invention is applied to an HSUPA communications system in which each TTI is configured to be 2 ms, the reception moment and the effectively starting moment each correspond to a system frame number and a corresponding subframe number. Generally, one transmission subframe has a length of one TTI. When this embodiment of the present invention is applied to an HSUPA communications system in which each TTI is configured to be 10 ms, the reception moment and the effectively starting moment each correspond to a system frame number.

For example, when the TDM scheduling mechanism is introduced into the HSUPA system, according to this embodiment of the present invention, it may be predefined that in one scheduling process, a moment at which grant information is sent to first user equipment (which corresponds to user equipment whose granted permission is cancelled) is a period of time later than a moment at which grant information is sent to second user equipment (which corresponds to user equipment that is granted a permission to send HSUPA uplink data). In this way, the first user equipment and the second user equipment can determine effectively starting moments of the pieces of grant information according to the received pieces of grant information and the reception moments at which the pieces of grant information are received. In this way, it can be implemented that the first user equipment stops sending HSUPA uplink data and the second user equipment starts to send HSUPA uplink data at a same moment (which corresponds to a system frame number and a subframe number). Therefore, a transmission gap or mutual interference caused when the foregoing operations do not occur at a same moment is avoided, and scheduling performance is improved.

Optionally, as an embodiment, the memory 605 may also store an instruction that enables the processor 604 to execute the following process:

the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

It should be understood that a non-zero-value grant value indicates that in a process in which the UE transmits HSUPA uplink scheduling data in a corresponding TTI, a maximum power ratio of an enhanced dedicated channel dedicated physical data channel (E-DPDCH) to a dedicated physical control channel is a non-zero value. A zero-value grant value indicates that in a process in which HSUPA uplink scheduling data is transmitted in a corresponding TTI, a maximum power ratio of an enhanced dedicated channel dedicated physical data channel to a dedicated physical control channel is less than any non-zero-value grant value, and the value may be zero or may not be zero. An inactive grant value indicates that the UE cannot transmit HSUPA uplink scheduling data in a corresponding TTI. It should also be understood that the corresponding TTI is a TTI corresponding to the effectively starting moment of the grant information.

Optionally, the memory 605 may also store an instruction that enables the processor 604 to execute the following process:

the uplink data channel is an enhanced dedicated channel dedicated physical data channel, the data is High Speed Uplink Packet Access HSUPA uplink data, and when the effectively starting moment of the grant information is determined according to the grant value and the reception moment at which the grant information is received, when the grant value belongs to the first grant value set, determining to start, in the $p^{th}$ subframe of a system frame number q of the enhanced dedicated channel dedicated physical data channel, to send the High Speed Uplink Packet Access HSUPA uplink data, where $p=i+s_1$ and $q=t_1$ define a timing relationship between the effectively starting moment and the reception moment, p represents the system frame number of an enhanced dedicated channel absolute grant channel corresponding to the effectively starting moment, q represents a subframe number of a system frame number corresponding to the effectively starting moment, i is a system frame number corresponding to the reception moment, $s_1$ is a first system frame number increment, and $t_1$ is a first subframe offset in a system frame; or when the grant value belongs to the second grant value set, determining to stop, in the $q^{th}$ subframe of the system frame number p of the enhanced dedicated channel dedicated physical data channel, sending the HSUPA uplink data, where $p=i+s_2$ and $q=t_2$ define a timing relationship between the effectively starting moment and the reception moment, p represents the system frame number corresponding to the effectively starting moment, $s_2$ is a second system frame number increment, and $t_2$ is a second subframe offset in a system frame.

It should be understood that the first system frame number increment and the second system frame number increment each represent an increment or an offset of a system frame number on the enhanced dedicated channel dedicated physical data channel, and the first subframe offset and the second subframe offset each represent an offset of a subframe number in a system frame number on the enhanced dedicated channel dedicated physical data channel.

Optionally, the memory 605 may also store an instruction that enables the processor 604 to execute the following process:

determining $s_1$ and $t_1$ according to formula (7):

$$s_1 = \left\lfloor \frac{\left\lceil \frac{30j + T_1 - (\tau_{DPCH,n}/256)}{30} \right\rceil}{5} \right\rfloor, \quad (7)$$

$$t_1 = \left\lceil \frac{30j + T_1 - (\tau_{DPCH,n}/256) - 150s_1}{30} \right\rceil;$$

or determining $s_2$ and $t_2$ according to formula (8):

$$s_2 = \left\lfloor \frac{\left\lceil \frac{30j + T_2 - (\tau_{DPCH,n}/256)}{30} \right\rceil}{5} \right\rfloor, \quad (8)$$

$$t_2 = \left\lceil \frac{30j + T_2 - (\tau_{DPCH,n}/256) - 150s_2}{30} \right\rceil,$$

where T represents an effectively starting moment increment, $T_2=T_1 \alpha \Delta T$, $\Delta T$ is a positive or negative integer multiple of a length of a transmission timing interval TTI, j represents a subframe number of the system frame number corresponding to the reception moment, and $\tau_{DPCH,n}$ represents a timing offset of a downlink DPCCH channel.

It should be understood that a symbol when a spreading factor is 256 is used as a time unit of each of 30j, $T_1$, $T_2$, and $\Delta T$, a chip is used as a time unit of $\tau_{DPCH,n}$, a symbol is also used as a time unit of $\tau_{DPCH,n}$ divided by 256, and one TTI is equal to 30 symbols. When an F-DPCH channel is configured in a cell in which the UE is located, $\tau_{DPCH,n}=\tau_{F-DPCH,n}$.

Optionally, the memory 605 may also store an instruction that enables the processor 604 to execute the following process:

receiving $T_1$ and $\Delta T$ that are sent by the network device; or receiving $T_2$ and $\Delta T$ that are sent by the network device; or receiving $T_1$ and $T_2$ that are sent by the network device.

Optionally, the memory 605 may also store an instruction that enables the processor 604 to execute the following process:

before the determining an effectively starting moment of the grant information according to the grant information and a reception moment at which the grant information is received, receiving configuration signaling sent by the network device, where the configuration signaling is used to indicate starting the operation of determining the effectively starting moment of the grant information according to the grant information and the reception moment at which the grant information is received.

In this way, the UE can flexibly select, according to the configuration signaling, whether to determine the effectively starting moment of the grant information according to the grant information and the reception moment at which the grant information is received or to determine the effectively starting moment of the grant information according to the reception moment at which the grant information is received.

Figure 7:
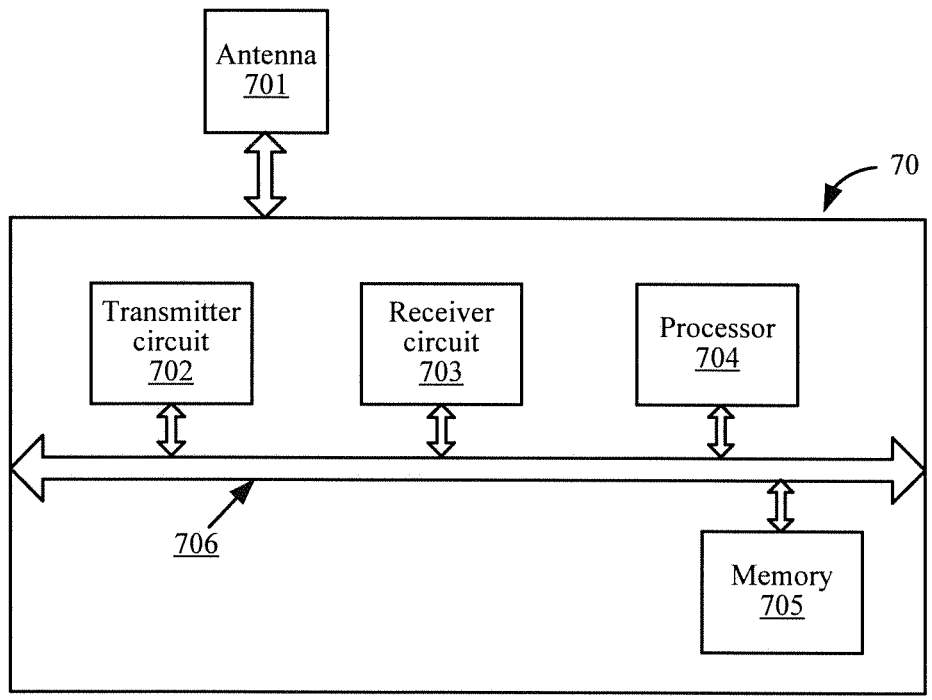
FIG. 7 is a schematic block diagram of a network device according to another embodiment of the present invention.

FIG. 7 is a schematic block diagram of a network device according to another embodiment of the present invention.

The network device 70 in FIG. 7 may be configured to implement the steps and the methods in the foregoing method embodiments. The network device 70 may be applied to various communications systems. In this embodiment in FIG. 7, the network device 70 includes an antenna 701, a transmitter circuit 702, a receiver circuit 703, a processor 704, and a memory 705. The processor 704 controls an operation of the network device 70, and may be configured to process a signal. The memory 705 may include a read-only memory and a random access memory, and provide an instruction and data to the processor 704. The transmitter circuit 702 and the receiver circuit 703 may be coupled to the antenna 701. Components of the network device 70 are coupled together by using a bus system 706, where besides a data bus, the bus system 706 further includes a power supply bus, a control bus, and a status signal bus. However, to make the description clear, all buses are marked as the bus system 706 in the figure.

Specifically, the memory 705 may store an instruction that enables the processor 704 to execute the following processes:

determining grant information corresponding to user equipment, where the grant information indicates a grant value of data transmission on an uplink data channel by the user equipment, and the grant value can be used by the user equipment to determine an effectively starting moment of the grant information; sending the grant information to the user equipment, to schedule, by using the grant value, the user equipment to adjust, on the uplink data channel and based on the grant value, transmission of the data at the effectively starting moment, where the grant value belongs to one of multiple grant value sets, the multiple grant value sets have no overlap, timing relationships between effectively starting moments corresponding to grant values in a same grant value set and reception moments at which the user equipment receives grant information are defined by a same timing relationship, and timing relationships between effectively starting moments corresponding to grant values in different grant value sets and reception moments are defined by different timing relationships.

Based on the foregoing technical solution, in the scheduling grant control method in this embodiment of the present invention, after receiving grant information, UE may flexibly select different effectively starting moments according to different grant information. Especially, when a TDM scheduling mechanism is introduced into an HSUPA system, this embodiment of the present invention provides an applicable implementation manner for further improving scheduling performance.

It should be understood that in this embodiment of the present invention, the reception moment and the effectively starting moment of the grant information each correspond to a frame number in the communications system. For example, when this embodiment of the present invention is applied to an HSUPA communications system in which each TTI is configured to be 2 ms, the reception moment and the effectively starting moment each correspond to a system frame number and a corresponding subframe number. Generally, one transmission subframe has a length of one TTI. When this embodiment of the present invention is applied to an HSUPA communications system in which each TTI is configured to be 10 ms, the reception moment and the effectively starting moment each correspond to a system frame number.

For example, when the TDM scheduling mechanism is introduced into the HSUPA system, according to this embodiment of the present invention, it may be predefined that in one scheduling process, a moment at which grant information is sent to first user equipment (which corresponds to user equipment whose granted permission is cancelled) is a period of time later than a moment at which grant information is sent to second user equipment (which corresponds to user equipment that is granted a permission to send HSUPA uplink data). In this way, the first user equipment and the second user equipment can determine effectively starting moments of the pieces of grant information according to the received pieces of grant information and the reception moments at which the pieces of grant information are received. In this way, it can be implemented that the first user equipment stops sending HSUPA uplink data and the second user equipment starts to send HSUPA uplink data at a same moment (which corresponds to a system frame number and a subframe number). Therefore, a transmission gap or mutual interference caused when the foregoing operations do not occur at a same moment is avoided, and scheduling performance is improved.

Optionally, as an embodiment, the memory 705 may also store an instruction that enables the processor 704 to execute the following process:

the multiple grant value sets include a first grant value set and a second grant value set, the first grant value set includes non-zero-value grant values, and the second grant value set includes a zero-value grant value and an inactive grant value; or the multiple grant value sets include a first grant value set and a second grant value set, the first grant value set includes non-zero-value grant values and a zero-value grant value, and the second grant value set includes an inactive grant value.

It should be understood that a non-zero-value grant value indicates that in a process in which the UE transmits HSUPA uplink scheduling data in a corresponding TTI, a maximum power ratio of an enhanced dedicated channel dedicated physical data channel (E-DPDCH) to a dedicated physical control channel is a non-zero value. A zero-value grant value indicates that in a process in which HSUPA uplink scheduling data is transmitted in a corresponding TTI, a maximum power ratio of an enhanced dedicated channel dedicated physical data channel to a dedicated physical control channel is less than any non-zero-value grant value, and the value may be zero or may not be zero. An inactive grant value indicates that the UE cannot transmit HSUPA uplink scheduling data in a corresponding TTI. It should also be understood that the corresponding TTI is a TTI corresponding to the effectively starting moment of the grant information.

Optionally, as an embodiment, the memory 705 may also store an instruction that enables the processor 704 to execute the following process:

sending configuration signaling to the user equipment, where the configuration signaling is used to instruct the user equipment to start the operation of determining the effectively starting moment of the grant information according to the grant information and the reception moment at which the grant information is received.

In this way, the UE can flexibly select, according to the configuration signaling, whether to determine the effectively starting moment of the grant information according to the grant information and the reception moment at which the grant information is received or to determine the effectively starting moment of the grant information according to the reception moment at which the grant information is received.

It should be understood that the term "and/or" in the embodiments of the present invention describes only an association relationship describing associated objects, and indicates that three relationships may exist. For example, A and/or B may indicate the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A scheduling grant control method, comprising:
   receiving grant information sent by a network device, wherein the grant information indicates a grant value of data transmission on an uplink data channel by user equipment;
   determining a starting moment of the grant information according to the grant value and a reception moment at which the grant information is received;
   adjusting, on the uplink data channel and based on the grant value, transmission of the data at the starting moment;
   wherein the grant value belongs to one of multiple grant value sets, the multiple grant value sets have no overlap, timing relationships between starting moments corresponding to grant values in a same grant value set and the reception moment are defined by a same timing relationship, and timing relationships between starting moments corresponding to grant values in different grant value sets and the reception moment are defined by different timing relationships; and
   wherein the multiple grant value sets comprise a first grant value set and a second grant value set, the first grant value set comprises non-zero-value grant values, and the second grant value set comprises a zero-value grant value or an inactive grant value.

2. The control method according to claim 1, wherein:
   the uplink data channel is an enhanced dedicated channel dedicated physical data channel, and the data is High Speed Uplink Packet Access (HSUPA) uplink data; and
   determining the starting moment of the grant information according to the grant value and the reception moment at which the grant information is received comprises:
      when the grant value belongs to the first grant value set, determining to start, in the $q^{th}$ subframe of a system frame number p of the enhanced dedicated channel dedicated physical data channel, to send the HSUPA uplink data, wherein $p=i+s_1$ and $q=t_1$ define a timing relationship between the starting moment and the reception moment, p represents the system frame number corresponding to the starting moment, q represents a subframe number of the system frame number corresponding to the starting moment, i is a system frame number of an enhanced dedicated channel absolute grant channel corresponding to the reception moment, $s_1$ is a first system frame number increment, and $t_1$ is a first subframe offset in a system frame, or
      when the grant value belongs to the second grant value set, determining to stop, in the $q^{th}$ subframe of the system frame number p of the enhanced dedicated channel dedicated physical data channel, sending the HSUPA uplink data, wherein $p=i+s_2$ and $q=t_2$ define a timing relationship between the starting moment and the reception moment, $s_2$ is a second system frame number increment, and $t_2$ is a second subframe offset in a system frame.

3. The control method according to claim 2, wherein $s_1$ and $t_1$ are determined according to the following formula:

$$s_1 = \left\lfloor \frac{\left\lceil \frac{30j + T_1 - (\tau_{DPCH,n}/256)}{30} \right\rceil}{5} \right\rfloor,$$

$$t_1 = \left\lceil \frac{30j + T_1 - (\tau_{DPCH,n}/256) - 150s_1}{30} \right\rceil;$$

and $s_2$ and $t_2$ are determined according to the following formula:

$$s_2 = \left\lfloor \frac{\left\lceil \frac{30j + T_2 - (\tau_{DPCH,n}/256)}{30} \right\rceil}{5} \right\rfloor,$$

-continued $$t_2 = \left\lceil \frac{30j + T_2 - (\tau_{DPCH,n}/256) - 150s_2}{30} \right\rceil,$$

wherein $T_1$ represents a starting moment increment, $T_2=T_1+\Delta T$, $\Delta T$ is a positive or negative integer multiple of a length of a transmission timing interval (TTI), j represents a subframe number of the system frame number corresponding to the reception moment, and $\tau_{DPCH,n}$ represents a timing offset of a downlink dedicated physical control channel (DPCCH).

4. The control method according to claim 3, further comprising:

receiving $T_1$ and $\Delta T$ that are sent by the network device; or receiving $T_2$ and $\Delta T$ that are sent by the network device; or receiving $T_1$ and $T_2$ that are sent by the network device.

5. The control method according to claim 1, before determining the starting moment of the grant information according to the grant value and the reception moment at which the grant information is received, the method further comprises:

receiving configuration signaling sent by the network device for indicating starting the operation of determining the starting moment of the grant information according to the grant value and the reception moment at which the grant information is received.

6. A scheduling grant control method, comprising:

determining grant information corresponding to user equipment, wherein the grant information indicates a grant value of data transmission on an uplink data channel by the user equipment for enabling the user equipment to determine a starting moment of the grant information;

sending the grant information to the user equipment to enable the user equipment to schedule, by using the grant value, the user equipment to adjust, on the uplink data channel and based on the grant value, transmission of the data at the starting moment;

wherein the grant value belongs to one of multiple grant value sets, the multiple grant value sets have no overlap, timing relationships between starting moments corresponding to grant values in a same grant value set and the reception moment at which the user equipment receives the grant information are defined by a same timing relationship, and timing relationships between starting moments corresponding to grant values in different grant value sets and the reception moment are defined by different timing relationships; and wherein the multiple grant value sets comprise a first grant value set and a second grant value set, the first grant value set comprises non-zero-value grant values, and the second grant value set comprises a zero-value grant value or an inactive grant value.

7. The control method according to claim 6, further comprising:

sending configuration signaling to the user equipment for instructing the user equipment to start the operation of determining the starting moment of the grant information according to the grant value and the reception moment at which the grant information is received.

8. User equipment, comprising:
a processor; and
memory coupled to the processor, the memory comprising instructions that, when executed by the processor, cause the user equipment to:

receive grant information sent by a network device for indicating a grant value of data transmission on an uplink data channel by the user equipment;

determine a starting moment of the grant information according to the grant value and a reception moment at which the grant information is received;

adjust, on the uplink data channel and based on the grant value, transmission of the data at the starting moment;

wherein the grant value belongs to one of multiple grant value sets, the multiple grant value sets have no overlap, timing relationships between starting moments corresponding to grant values in a same grant value set and the reception moment are defined by a same timing relationship, and timing relationships between starting moments corresponding to grant values in different grant value sets and the reception moment are defined by different timing relationships; and wherein the multiple grant value sets comprise a first grant value set and a second grant value set, the first grant value set comprises non-zero-value grant values, and the second grant value set comprises a zero-value grant value or an inactive grant value.

9. The user equipment according to claim 8, wherein:
the uplink data channel is an enhanced dedicated channel dedicated physical data channel, and the data is High Speed Uplink Packet Access (HSUPA) uplink data; and
the memory comprises instructions that, when executed by the processor, cause the user equipment to:

when the grant value belongs to the first grant value set, determine to start, in the $p^{th}$ subframe of a system frame number q of the enhanced dedicated channel dedicated physical data channel, to send the HSUPA uplink data, wherein $p=i+s_1$ and $q=t_1$ define a timing relationship between the starting moment and the reception moment, p represents the system frame number corresponding to the starting moment, q represents a subframe number of the system frame number corresponding to the starting moment, i is a system frame number of an enhanced dedicated channel absolute grant channel corresponding to the reception moment, $s_1$ is a first system frame number increment, and $t_1$ is a first subframe offset in a system frame, or when the grant value belongs to the second grant value set, determine to stop, in the $p^{th}$ subframe of the system frame number q of the enhanced dedicated channel dedicated physical data channel, sending the HSUPA uplink data, wherein $p=i+s_2$ and $q=t_2$ define a timing relationship between the starting moment and the reception moment, $s_2$ is a second system frame number increment, and $t_2$ is a second subframe offset in a system frame.

10. The user equipment according to claim 9, wherein the memory comprises instructions that, when executed by the processor, cause the user equipment to:

determine $s_1$ and $t_1$ according to the following formula:

$$s_1 = \left\lfloor \frac{\left\lceil \frac{30j + T_1 - (\tau_{DPCH,n}/256)}{30} \right\rceil}{5} \right\rfloor,$$

-continued
$$t_1 = \left\lceil \frac{30j + T_1 - (\tau_{DPCH,n}/256) - 150s_1}{30} \right\rceil;$$

and determine $s_2$ and $t_2$ according to the following formula:

$$s_2 = \left\lfloor \frac{\left\lceil \frac{30j + T_2 - (\tau_{DPCH,n}/256)}{30} \right\rceil}{5} \right\rfloor,$$

$$t_2 = \left\lceil \frac{30j + T_2 - (\tau_{DPCH,n}/256) - 150s_2}{30} \right\rceil,$$

wherein $T_1$ represents a starting moment increment, $T_2=T_1+\Delta T$, $\Delta T$ is a positive or negative integer multiple of a length of a transmission timing interval TTI, j represents a subframe number of the system frame number corresponding to the reception moment, and $\tau_{DPCH,n}$ represents a timing offset of a downlink DPCCH channel.

11. The user equipment according to claim 10, wherein the memory comprises instructions that, when executed by the processor, cause the user equipment to:

receive $T_1$ and $\Delta T$ that are sent by the network device; or receive $T_2$ and $\Delta T$ that are sent by the network device; or receive $T_1$ and $T_2$ that are sent by the network device.

12. The user equipment according to claim 11, wherein the memory comprises instructions that, when executed by the processor, cause the user equipment to:

receive configuration signaling sent by the network device for indicating starting the operation of determining the starting moment of the grant information according to the grant value and the reception moment at which the grant information is received.

13. A network device, comprising:
a processor; and
memory coupled to the processor, the memory comprising instructions that, when executed by the processor, cause the network device to:
determine grant information corresponding to a user equipment, wherein the grant information indicates a grant value of data transmission on an uplink data channel by the user equipment for enabling the user equipment to determine a starting moment of the grant information;
send the grant information to the user equipment to enable the user equipment to schedule, by using the grant value, the user equipment to adjust, on the uplink data channel and based on the grant value, transmission of the data at the starting moment;
wherein the grant value belongs to one of multiple grant value sets, the multiple grant value sets have no overlap, timing relationships between starting moments corresponding to grant values in a same grant value set and the reception moment at which the user equipment receives the grant information are defined by a same timing relationship, and timing relationships between starting moments corresponding to grant values in different grant value sets and the reception moment are defined by different timing relationships; and
wherein the multiple grant value sets comprise a first grant value set and a second grant value set, the first grant value set comprises non-zero-value grant values, and the second grant value set comprises a zero-value grant value or an inactive grant value.

14. The network device according to claim 13, wherein the memory comprises instructions that, when executed by the processor, cause the network device to:
send configuration signaling to the user equipment for instructing the user equipment to start the operation of determining the starting moment of the grant information according to the grant value and the reception moment at which the grant information is received.

* * * * *